Feb. 5, 1952     B. E. O'CONNOR     2,584,222
AUXILIARY MASS AND VISCOUS DAMPING FOR
FREE AND SELF-EXCITED VIBRATIONS
Filed June 7, 1947
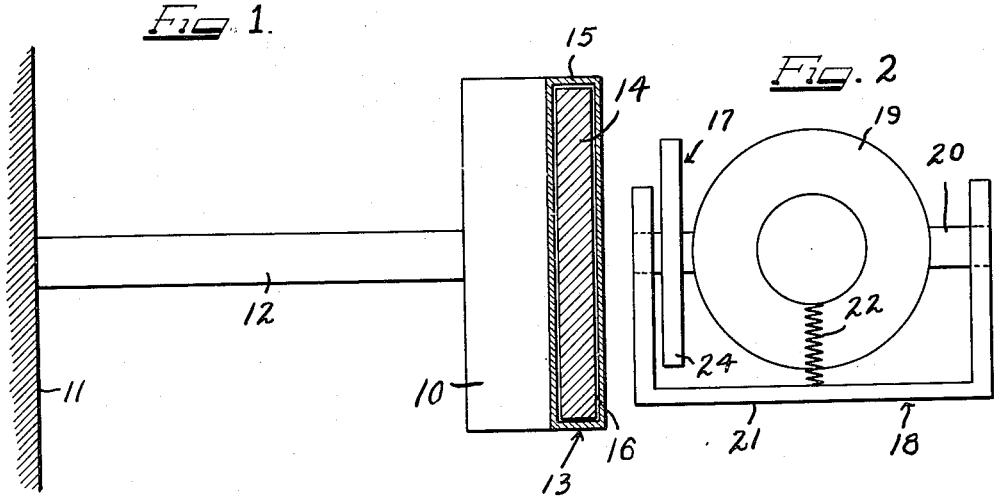
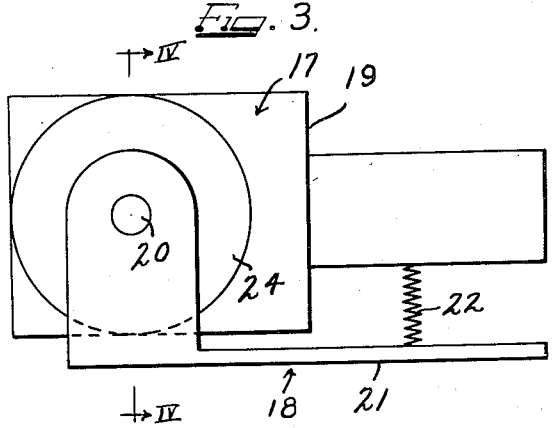
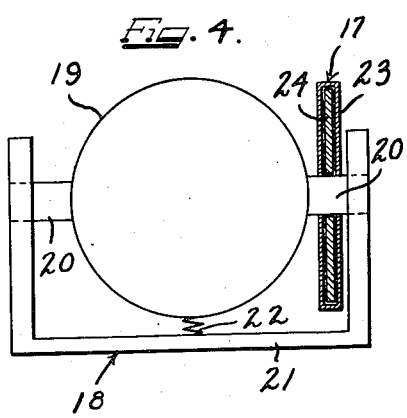
Inventor
BERNARD E. O'CONNOR Patented Feb. 5, 1952

2,584,222

UNITED STATES PATENT OFFICE 2,584,222

AUXILIARY MASS AND VISCOUS DAMPING FOR FREE AND SELF-EXCITED VIBRATIONS

Bernard E. O'Connor, Buffalo, N. Y., assignor to Houdaille-Hershey Corporation, Detroit, Mich., a corporation of Michigan Application June 7, 1947, Serial No. 753,391

6 Claims. (Cl. 74—5.5)

This invention relates to improvements in the damping of free and self-excited vibrations and more especially to the damping of such vibrations in apparatus units wherein the normal operation requires a certain amount of relative oscillatory movement between the apparatus and an associated structure, which movement must be unrestrained; but any undesirable oscillatory vibrations which may tend to occur incidental to the desirable movements of the apparatus must be prevented or dampened.

In many cases where a mechanical installation or system includes an operatively oscillatory mass which is resiliently mounted, the inherent damping in the system is not sufficient to bring the mass to rest in a sufficiently short period of time, or for some reason a self-excited vibration may exist. Where practicable, a damper such as a shock absorber may be connected between the oscillating mass and some rigid structure for rapidly damping out the undesirable oscillations and/or preventing self-excited oscillations. However, the use of such a shock absorber usually results in an increase of the transmitted load. In certain instances, therefore, this is objectionable because it tends to destroy the sensitivity of the particular system of which the mass is a part. Certain sensitive instruments of which gyrostabilizers are an example, fall in this category. A gyroscopic stabilizer must follow any motion instantaneously but tends to oscillate after a displacement from equilibrium. Obviously the conventional types of shock absorber dampers would impair the sensitivity of the stabilizer.

It is accordingly an important object of the present invention to provide new and improved means for damping free and self-excited vibrations without any increase in the transmitted load or drag which might detrimentally affect the mass being damped.

Another object of the invention is to provide means for damping free and self-excited vibrations and which is adapted to be carried directly by the mass in which the vibrations are to be damped.

A further object of the invention is to provide a novel damper for free and self-excited vibrations which is simple and economical to make and install and which is practically free from any deterioration due to wearing of parts and which is never in need of any adjustments because of wear.

Other objects, features and advantages of the present invention will be readily apparent from the following detailed description of certain preferred embodiments thereof taken in conjunction with the accompanying drawings in which:

Figure 1 is a schematic showing of an installation including a damper according to the present invention, and with certain parts in section;

Figure 2 is a schematic and elevational view of a gyroscopic stabilizer including a damper embodying the present invention;

Figure 3 is a side elevational view of the stabilizer; and

Figure 4 is an opposite end view of the stabilizer with the damper in section taken on the line IV—IV of Figure 3.

As shown on the drawings:

In a general sense, the damper of the present invention is applicable to any apparatus including a system wherein a mass 10 (Figure 1) is supported with respect to a support 11 in a manner for relative oscillation, means such as a torsion spring 12 comprising the physical connection between the mass 10 and the support 11.

Since the mass 10 might tend to oscillate for an excessive period of time if displaced from its equilibrium position or might be unstable and therefore subject to self-excited vibration due to other factors, it is equipped with a novel vibration damper 13 according to the present invention.

In its simplest form, the vibration damper 13 comprises merely a circular, disk, inertia mass 14 freely housed within an entirely enclosing casing 15. The side walls and periphery of the circular casing 15 are preferably so dimensioned relative to the dimensions of the inertia mass 14 that substantially uniform very close spacing prevails between all of the opposed surfaces of the mass 14 and the casing 15. Such spacing is shown in substantially exaggerated idealized form at 16.

Although the inertia mass 14 has been shown as free of any center bearing, it could be thus mounted within the casing 15 where desirable.

Within the space 16 is a viscous fluid such as a silicone. This viscous fluid may completely fill all of the space within the chamber afforded by the casing 15, where there are no substantial changes in temperature, but where the temperature may increase very materially, a slight air space may be provided to afford expansion relief for the fluid.

In operation, the casing 15 moves with the mass 10 and as a part thereof. To put it another way, the casing 15 moves with the mass 10 or follows the same where the base or supporting structure 11 moves relative to the mass 10. In such relationship of the casing 15 and the mass 10, the inertia mass 14 tends to remain in static equilibrium and may rotate relative to the casing 15 freely where the amplitude of relative oscillation is relatively low. But where the amplitude of oscillation is relatively high, the inertia mass 14 tends to resist relative displacement of the casing since the viscous fluid forms a viscous shear film coupling between the inertia mass 14 and the casing 15, thus quickly and smoothly dampening the vibrations.

In a more specific application of the principles of the present invention, a viscous film damper 17 is adapted to be operatively associated with an instrument such as a gyroscopic stabilizer 18. Such a stabilizer comprises a gyroscopic unit 19 supported pivotally as by means of trunnions 20 journaled in a support or base 21. A spring 22 tends to maintain the gyroscopic unit 19 in a condition of equilibrium relative to the base 21. This spring allows the stabilizer to follow any motion instantaneously, but after return to equilibrium position there is a tendency to vibrate due to the energy of the spring.

The vibration damper 17 is secured to move with the gyroscopic unit 19, as by securing it concentrically with one of the trunnions 20. That is, a damper casing 23 is secured fixedly to a trunnion 20 and within the casing is a free floating inertia mass 24 in the form of a ring disk so dimensioned relative to the interior of the casing 23 that a uniform spacing prevails relative to the sides and periphery of the inertia mass 24. A viscous fluid within the chamber provided by the casing affords a shear film between all of the opposed surfaces of the casing and inertia mass which will resist relative movement between the inertia mass and the casing during vibratory oscillations and thus dampen such vibrations.

It will thus be apparent that while the damper does not interfere with free operation or functioning of the instrument or mass with which the damper is associated, the damper does effectively damp out free vibrations and prevent self-excited vibrations. Stated another way, the damper of the present invention renders stable various instrumentalities, and in particular such as depend upon the action of springs in the system and are thus subject to free vibrations if displaced which might continue for a considerable length of time and might be subject to self-excited vibration if rendered unstable by other components of the system. The damping means afforded by the invention is especially useful where there is no means of applying damping in the conventional manner.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In combination with a mass adapted to be mounted in relatively oscillatable relation to an associated structure and including spring means in its system of support tending to maintain or return it to an equilibrium position and thus tending to excite vibrations in the mass, a vibration damper including a closed casing fixedly mounted with respect to said mass to move therewith, said casing providing a circular chamber, an inertia mass within said chamber and dimensioned in at least certain surfaces of relatively substantial area to lie operationally in such closely spaced relation to opposing surfaces within said casing that a viscous fluid therebetween will be limited to a shear film, and a viscous fluid within said casing and providing a shear film between said inertia mass and the opposing surfaces tending to restrain the casing and thereby said first mentioned mass against vibratory movements independent of said inertia mass, whereby such vibratory movements are dampened.

2. In combination with a mass subject to operational oscillations and including spring means in its system of support tending to maintain or return it to an equilibrium position and thus tending to excite vibrations in the mass, a vibration damper including a closed casing fixedly mounted with respect to said mass to move therewith in said operational oscillations, said casing providing a circular chamber, an inertia mass within said chamber and dimensioned in at least certain surfaces of relatively substantial area to lie operationally in closely spaced relation to opposing surfaces within said casing, and a viscous fluid within said casing and providing a shear film between said inertia mass and the opposing surfaces tending to restrain the casing and thereby said oscillatable mass against vibratory movement independent of said inertia mass, whereby such vibratory movement is dampened, said inertia mass comprising a solid disk.

3. In combination in a mechanical organization including an oscillating mass having oscillating modes of movement of low magnitude and subject to vibratory oscillations of high magnitude, means for supporting said mass and including a spring structure acting normally to return the mass to a position of neutral equilibrium from low magnitude oscillations and in so doing creating said high magnitude vibratory oscillations, a rotary inertia mass, an enclosure for said inertia mass fixedly movable with said oscillating mass and closely confining said inertia mass to a predetermined spaced relation affording only shear film spacing for a viscous fluid between the opposing surfaces of the inertia mass and the enclosure, there being a viscous fluid in the space between the casing and inertia mass providing a viscous shear film coupling therebetween, said inertia mass being movable with the oscillating mass and the casing in the low magnitude modes of oscillation thereof, but tending to remain static in the vibratory oscillations of the oscillating mass and thereby through said viscous coupling damping such vibratory oscillations.

4. In combination in apparatus including a supporting structure, an operational mass resiliently supported in association with said supporting structure for relative oscillatory movement of the mass and structure, a viscous shear film damper comprising an inertia mass and a casing therefor supported in fixed association with said operational mass and effectively resisting and damping oscillatory vibrations of the operational mass, said operational mass being carried by trunnions and said casing being secured fixedly to one of said trunnions, and a spring operative for normally maintaining the operational mass in neutral equilibrium.

5. In combination, a gyroscopic unit having trunnions, a support journaling said trunnions and affording low magnitude oscillatory movement of the gyroscopic unit, a spring connected between the gyroscopic unit and the support and normally acting to return the gyroscopic unit to neutral equilibrium, the spring setting up high magnitude vibrations in the gyroscopic unit in the operation of the spring to return the gyroscopic unit to neutral equilibrium, and a rotary viscous vibration damper carried by the gyroscopic unit on the axis of one of said trunnions and functioning to dampen said high magnitude vibrations.

6. In combination, an operating mass, a stationary support, said mass being carried by said support for relative movement about an axis of oscillation, a torsion spring connecting said operating mass to the stationary support and enabling low magnitude oscillations of the mass relative to the support, and a rotary viscous vibration damper carried by the operating mass on said axis of oscillation thereof and functioning to dampen high magnitude oscillations resulting from return of the operating mass to normal position following said low magnitude oscillations.

BERNARD E. O'CONNOR.

REFERENCES CITED

The following references are of record in the file of this patent:

UNITED STATES PATENTS

| Number | Name | Date |
| --- | --- | --- |
| 1,900,709 | Henderson | Mar. 7, 1933 |
| 1,969,755 | Kellogg | Aug. 14, 1934 |
| 2,013,109 | Reynolds | Sept. 3, 1935 |
| 2,113,390 | Zimmerman | Apr. 5, 1938 |
| 2,236,340 | Marggraf | Mar. 25, 1941 |
| 2,291,612 | Draper | Aug. 4, 1942 |
| 2,411,550 | Lynn et al. | Nov. 26, 1946 |
| 2,514,139 | O'Connor | July 4, 1950 |

FOREIGN PATENTS

| Number | Country | Date |
| --- | --- | --- |
| 537,718 | Great Britain | July 3, 1941 |